United States Patent

Jähme

Patent Number: 5,254,745
Date of Patent: Oct. 19, 1993

[54] MELAMINE POLYOLS COINITIATED WITH TOLUENE DIAMINE HAVING REDUCED VISCOSITY

[75] Inventor: Joachim Jähme, Bobenheim-Roxheim, Fed. Rep. of Germany

[73] Assignee: BASF Corporation, Parsippany, N.J.

[21] Appl. No.: 791,299

[22] Filed: Nov. 12, 1991

[51] Int. Cl.$^5$ ............................................. C07C 43/11
[52] U.S. Cl. ................................. 568/613; 544/196; 544/200; 521/128; 521/166; 521/167; 568/617; 568/623; 568/624; 568/625
[58] Field of Search ............ 544/196, 200, 121; 621/128, 166, 167; 560/672; 568/613, 617, 623, 624, 625

[56] References Cited

U.S. PATENT DOCUMENTS 4,656,201   4/1987   Marx et al. ........................ 521/166

FOREIGN PATENT DOCUMENTS 0395316   10/1990   European Pat. Off. .

Primary Examiner—Mukund J. Shah
Assistant Examiner—Y. N. Gupta
Attorney, Agent, or Firm—Martin P. Connaughton

[57] ABSTRACT

Polyoxyalkylene polyols initiated with melamine and coinitiated with toluene diamine and oxyalkylated with one or more alkylene oxides have relatively low viscosity and are suitable for preparing polyurethane foams.

19 Claims, No Drawings

MELAMINE POLYOLS COINITIATED WITH TOLUENE DIAMINE HAVING REDUCED VISCOSITY

BACKGROUND OF THE INVENTION

1. Field of the Invention

The subject invention pertains to polyether polyols suitable for the preparation of polyurethane foams. More particularly, the subject invention pertains to polyether polyols initiated with melamine and coinitiated with toluene diamine which have lower viscosity than their all-toluene diamine initiated analogues.

2. Description of the Related Art

Melamine is an inexpensive readily available raw material which is finding increased usefulness in the preparation of flame-retardant polyurethane foams. See, for example, U.S. Pat. Nos. 4,745,133, 4,258,141, 4,849,959, 4,826,884, and 4,892,893.

Unfortunately, it is difficult to form dispersions of melamine in polyether polyols generally used to form polyurethane because the relatively coarse particle sizes commercially available tend to settle out over time. Thus continuous agitation or mixing melamine with polyol just prior to use is generally necessary.

To overcome these deficiencies, grinding of melamine in situ in the polyol at high local energy densities has been proposed. Further stability of the dispersion thus prepared is achieved through addition of special surfactants. See, for example, U.S. Pat. No. 4,293,657. However, in situ crushing of the polyol is time consuming and expensive. Moreover, the fine dispersions have large particle surface area, resulting in dispersions of high viscosity. The specialized surfactants add to the cost and may affect the properties of polyurethanes prepared therefrom. Finally, the melamine, whether coarse or fine, is largely unreacted with the isocyanate components, and therefore acts as an inert filler in the foam, generally detracting from the foam physical properties.

Polyether polyols based on melamine have been proposed, see for example U.S. Pat. Nos. 4,656,201 and 3,812,122. However, the products of these processes are not wholly satisfactory, and their preparation difficult.

Polyether polyols initiated with toluene diamine and their use in polyurethane foams is well known. However, the polyols initiated with toluene diamine are of relatively high viscosity, thus limiting their use. Toluene diamine initiated polyols may also improve the flame retardance of polyurethane foams prepared therefrom. Addition of melamine to such polyols would be expected to further increase polyurethane foam flame retardancy, but again continuous agitation is required for coarse melamine, while crushed melamine would increase the viscosity still further to totally unacceptable limits.

It would be desirable to produce polyols containing melamine in such a form that stable polyols are obtained at reasonable cost, and in which the melamine serves as more than merely a flame retardant filler. It would be desirable also to prepare toluene diamine polyols having lower viscosity than existing products.

OBJECTS OF THE INVENTION

It has now been surprisingly discovered that melamine, when coinitiated in the form of a suspension of melamine in toluene diamine, may produce polyols which may contain up to 50 weight percent melamine based on the weight of the initiators. These polyols are stable, and unexpectedly, generally have lower viscosities than similar polyols prepared only from toluene diamine.

DESCRIPTION OF THE PREFERRED EMBODIMENTS

The toluene diamines useful as coinitiators in the subject invention are the common toluene diamines available in commerce. Single isomers, for example 2,4- or 2,6-toluene diamine may be used, or isomer mixtures such as the commercially available 80:20 and 65:35 mixtures may be used. Vicinal toluene diamines, generated as a byproduct in the production of 2,4- or 2,6-toluene diamines are preferred. These toluene diamines are readily available and relatively inexpensive, as they are generally considered an unwanted byproduct of toluene diamine manufacture. Mixtures of 2,4-, 2,6-, and vicinal toluene diamines may also be used.

In addition to the toluene diamines, minor quantities of other conventional initiators in relation to the amount of toluene diamine, may be used. Examples of such initiators are the various glycols, polyhydric alcohols, mono- and disaccharides, alkanolamines, di- and polyhydric phenols, and di- and polyamines.

Examples of suitable glycols are, without limitation, ethylene glycol, propylene glycol, 1,4-butanediol, 1,6-hexanediol, neopentyl glycol, di- and triethylene glycol di- and tripropylene glycols, polyethylene glycols polypropylene glycols, and the like.

Examples of suitable polyhydric alcohols include glycerine, trimethylolpropane, triethylolpropane, pentaerythritol, and the like. Examples of suitable saccharides are sorbitol, mannitol, glucose, α-methylglucosides, fructose, sucrose, and commercial syrups such as molasses, corn syrup, and the like.

Suitable alkanolamines are ethanolamine, diethanolamine, triethanolamine, propanolamine, dipropanolamine, tripropanolamine, and the like. Suitable polyhydric phenols are hydroquinone and resorcinol, and polyphenols such as bisphenol A, bisphenol F, and the like. Also suitable are aminophenols such as p-aminophenol.

Suitable amines include both aliphatic and aromatic amines. Suitable aliphatic amines are alkylamines such as methylamine, ethylamine, propylamine, ethylenediamine, propylenediamine, diethylenetriamine, triethylenetetramine, and the like. Suitable aromatic amines include 1,2-, 1,3-, and 1,4-phenylenediamines, alkylsubstituted phenylenediamines excluding of course the toluenediamines, the various methylenedianiline isomers, particularly 4,4'-, 2,4'- and 2,2'-methylenedianiline, and polymethylenepolyphenylenepolyamines.

Melamine is generally utilized in the form of commercially available powders. Such melamine may have mean particle sizes ranging from 25 to about 250 μm, although smaller and larger particle size melamine is useful also. The melamine may be first crushed to finer particle size, either prior to addition to the coinitiator(s) or in situ. However, such crushing is unnecessary.

The melamine is dispersed in the polyol with constant agitation, and oxyalkylated with one or more alkylene oxides. Many alkylene oxides are suitable, however ethylene oxide, propylene oxide, butylene oxide, and their mixtures are preferred. The alkylene oxides may be used individually to prepare homopolymeric (save the initiator portion) polyoxyalkylene polyethers sequentially to form block polyoxyalkylene polyethers; or mixed to form heteric polyoxyalkylene polyethers. Combinations having homopolymeric blocks and heteric blocks, or multiple heteric blocks having different compositions are also possible.

Oxyalkylation takes place under conventional conditions, utilizing alkaline catalysis, under pressure. The TDA initiator is generally added to the reactor, stirring commenced, and melamine added. The oxyalkylation catalyst, preferably potassium hydroxide is added, preferably in the form of an aqueous solution, and the reactor closed, heated, and stripped with nitrogen to remove water. The reactor is then closed and padded with nitrogen. The alkylene oxide is metered in, keeping the pressure generally below 100 psig, preferably under 90 psig.

The amount of melamine may vary between 3 weight percent and 50 weight percent based on the total initiator weight, preferably from 6 to about 30 weight percent, and most preferably from 6 to 30 weight percent.

The polyols of the subject invention may be used alone or in conjunction with other polyols useful in preparing polyurethanes. The functionality of the polyol may be adjusted by mixing with other polyols of higher or lower functionality, or by adding a minor amount of a higher or lower functionality coinitiator.

The molecular weight of the polyols may vary over a wide range depending upon the desired application. Molecular weights of from 400 to about 20,000 are possible. The polyols generally have a functionality of from 2.5 to 6, preferably from 3 to about 6, and most preferably from 4 to 5.

The subject invention may now be illustrated by the following examples. These examples are not intended in any way to limit the scope of the invention.

EXAMPLE 1 (Comparative)

To toluene diamine containing 90% vicinal isomers in an amount of 1260 grams in a 2 gallon stainless steel stirred pressurized autoclave was added 5.1 grams of 45 weight percent aqueous potassium hydroxide. Following stripping of water, 4729 grams of propylene oxide was added over a 35 psig nitrogen pad, maintaining a maximum pressure of 90 psig. Time of propylene oxide addition was 12 hours, and reaction temperature was 150° C. The propylene oxide was allowed to react out for a period of four hours. The product was neutralized and filtered to remove salts of neutralization. The resulting polyol had a functionality of 4.0, a hydroxyl number of 390, and a viscosity of 60,000 cps at 25° C.

EXAMPLE 2

Following the procedure of comparative Example 1, a melamine polyol coinitiated with toluenediamine was prepared. The reactor charges were 64 g melamine, 1213 g toluene diamine (90% vicinals), 3.0 g 90% KOH, and 4723 g propylene oxide. The melamine was suspended in the toluene diamine. The product was a liquid, homogenous polyol having a functionality of 4.1, a hydroxyl number of 371, and despite the presence of melamine, a viscosity of 60,300 cps.

EXAMPLE 3

A polyol was prepared as in Example 2 but with the catalyst being 5.1 g 45% KOH. The product had a functionality of 4.1, a hydroxyl number of 384, and a viscosity of 47,800 cps.

EXAMPLE 4

Following the procedure of Example 2, a melamine polyol coinitiated with toluene diamine was prepared using as reactor charges 125 g melamine, 1125 g toluene diamine (90% vicinals), 3.0 g 90% KOH, and 4750 g propylene oxide. The resulting product had a functionality of 4.2, a hydroxyl number of 375, and a viscosity of 50,800 cps.

EXAMPLE 5

A polyol was prepared as in Example 2 using 239 g melamine, 956 g toluene diamine, 3.0 g 90% KOH, and 4805 g propylene oxide. The product had a functionality of 4.4, a hydroxyl number of 346, and a viscosity of 24,400 cps.

EXAMPLE 6 (Comparative)

Following the procedure of Example 1, 1260 g toluene diamine (90% vicinals) was oxyethylated with 4729 g ethylene oxide using 5.1 g 45% KOH. The resulting product had a functionality of 4.0, a hydroxyl number of 390, and a viscosity of 4200 cps.

EXAMPLE 7

Following the procedure of Example 2, a melamine polyol coinitiated with toluene diamine was prepared using 64 g melamine, 1213 g toluene diamine (90% vicinals), 4723 g ethylene oxide, and 5.2 g 45% KOH. The product had a functionality of 4.1, a hydroxyl number of 397, and a viscosity of only 1000 cps.

I claim:

1. A polyether polyol prepared by oxyalkylating, with one or more alkylene oxides in the presence of potassium hydroxide, a mixture of initiators consisting essentially of:
   a) toluene diamine;
   b) melamine in an amount of from about 1 to about 30 weight percent based on the total weight of a), b), and c); and
   c) optionally a minor amount with respect to toluene diamine, of an initiator other than toluene diamine or melamine.

2. The polyol of claim 1 wherein said amount of melamine is from about 6 to about 30 weight percent based on the weight of a), b), and c).

3. The polyol of claim 1 wherein said amount of melamine is from about 6 to about 20 weight percent based on the weight of a), b), and c).

4. The polyol of claim 1 wherein said alkylene oxide is selected from the group consisting of ethylene oxide, propylene oxide, butylene oxide, and mixtures thereof.

5. The polyol of claim 2 wherein said alkylene oxide is selected from the group consisting of ethylene oxide, propylene oxide, butylene oxide, and mixtures thereof.

6. The polyol of claim 3 wherein said alkylene oxide is selected from the group consisting of ethylene oxide, propylene oxide, butylene oxide, and mixtures thereof.

7. The polyol of claim 1 wherein the hydroxyl functionality is from about 4 to 5.

8. The polyol of claim 2 wherein the hydroxyl functionality is from about 4 to 5.

9. The polyol of claim 3 wherein the hydroxyl functionality is from about 4 to 5.

10. The polyol of claim 4 wherein the hydroxyl functionality is from about 4 to 5.

11. The polyol of claim 5 wherein the hydroxyl functionality is from about 4 to 5.

12. The polyol of claim 6 wherein the hydroxyl functionality is from about 4 to 5.

13. The polyol of claim 1 wherein the hydroxyl number is from 200 to about 500.

14. The polyol of claim 2 wherein the hydroxyl number is from 200 to about 500.

15. The polyol of claim 3 wherein the hydroxyl number is from 200 to about 500.

16. The polyol of claim 4 wherein the hydroxyl number is from 200 to about 500.

17. The polyol of claim 5 wherein the hydroxyl number is from 200 to about 500.

18. The polyol of claim 6 wherein the hydroxyl number is from 200 to about 500.

19. The polyol of claim 7 wherein the hydroxyl number is from 200 to about 500.

* * * * *